Oct. 9, 1934.  J. W. KITTREDGE  1,976,131
FLEXIBLE COUPLING FOR SHAFTING
Filed Aug. 10, 1931  3 Sheets-Sheet 1

INVENTOR
John W. Kittredge

Oct. 9, 1934.   J. W. KITTREDGE   1,976,131
FLEXIBLE COUPLING FOR SHAFTING
Filed Aug. 10, 1931   3 Sheets-Sheet 3

INVENTOR
John W. Kittredge

Patented Oct. 9, 1934

1,976,131

UNITED STATES PATENT OFFICE 1,976,131

FLEXIBLE COUPLING FOR SHAFTING

John W. Kittredge, Akron, Ohio

Application August 10, 1931, Serial No. 556,275

22 Claims. (Cl. 64—91)

It is well known that, due to defective workmanship, settling of foundations and other causes, shafts to be coupled are frequently not in true alignment, being at an angle with each other or, if parallel, being off-set and not in the same straight line, or being both off-set and non-parallel. If such shafts are rigidly coupled, they produce objectionable strains and vibrations, especially at high speeds. Also with electric motors, especially, a shaft has a certain endwise motion; and many couplings transmitting power through flexible materials and otherwise have been devised to compensate for the various motions of the shafts relative to each other. My coupling is to correct such misalignments and endwise motions, and its objects are;—

1st. To transmit the power through strong rigid members, eliminating from the power transmitting mechanism all yielding and flexible materials, and thus to make a coupling powerful and durable.

2nd. To eliminate, so far as possible, sliding or rolling motion under heavy pressure, and to substitute therefor swinging or radial motion, a swinging link attaining considerable movement at its outer end with a minimum of movement at its pivot.

3rd. To provide a float member, free within considerable limits to adjust itself to misaligned shafting, and by means of links, float and pivot connections, to correct larger misalignment, angular or off-set or both, than can be corrected by couplings heretofore devised.

4th. To make the links long without making the coupling entire excessively large, as the longer links correct greater errors.

5th. To attain such pivotal motion largely by rolling of concave-convex surfaces of slightly different radii and with a minimum of sliding.

6th. To transmit rotary motion uniformly from shaft to shaft with little or no acceleration or retardation.

7th. To have forces balanced so as to produce a turning moment only, with a minimum of transverse pressure on the shafts or their bearings.

8th. To transmit power in either direction or with either shaft the driver.

9th. To provide means to hold the float member approximately central when at rest; to hold it central and true when running under load and to hold it central and true when running idly.

10th. To have the float member relatively long in direction longitudinally of the line of shafting, but to have it small and light in cross section to more easily hold it central at all times and, when in motion, to hold it to rotation on its axis.

11th. To have the coupling simple and cheap.

12th. To have the coupling demountable so that it can be taken off or put on without moving either shaft.

I attain these objects by the mechanism shown in the accompanying drawings, in which,—

For clearness of description, duplicate parts are designated by a number with letters, as 6A, 6B, 6C, etc. A given part carries the same number throughout the several views.

Figure 4:
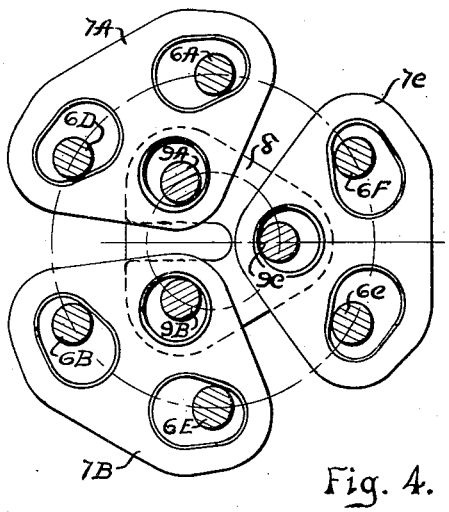
Fig. 4 is a cross section on line 2—2 of Fig. 1, similar to Fig. 2, but running idly.

Suppose shaft 4 is the driving shaft and rotating in the direction of the arrows, and shaft 12 the driven shaft. Flange 5 is rigidly connected to shaft 4 as by key 10. Rigidly fastened in flange 5 are a plurality of pins or pivots, preferably six in number, 6A, 6B, 6C, 6D, 6E and 6F, preferably 60 degrees apart and equidistant from the center of the shaft. These pivots carry a plurality of links, preferably three in number, 7A, 7B and 7C. A float member 8 runs centrally of the coupling and rigidly fastened in one end of it are a plurality of pivots, preferably three in number, 9A, 9B and 9C, preferably 120 degrees apart and equidistant from center of float 8. Pivots 9A, 9B and 9C fit in the three links 7A, 7B and 7C. And float 8 is thus connected to driving flange 5, all as shown in Figs. 1, 2 and 4.

Similarly, flange 13 is fastened rigidly on driven shaft 12, as by key 15. Rigidly fastened in flange 13 are a plurality of pivots 16, preferably six in number, preferably 60 degrees apart and equidistant from the center of shaft 12. And these pivots carry a plurality of links 17, preferably three in number. Pivots 14, preferably three in number, 120 degrees apart and equidistant from center of float 8, are rigidly fastened in the opposite end of float 8 from the pivots 9A, 9B and 9C aforesaid, or they may be the same pivots extending clear through the float and projecting on opposite ends as shown. Pivots 14 fit in links 17. And float 8 is thus connected to driven flange 13, as shown in Figs. 1 and 3, and in manner entirely similar to its connection to driving flange 5.

The links can be held on the pivots by any suitable means, as by washers 20 and cotter pins 21. I prefer to make each link a single piece of metal with holes big enough to slip over the heads of the pivots, as such links are inexpensive and very strong and durable. The links then fit loosely on the working portions of the pivots as shown.

Figure 1:
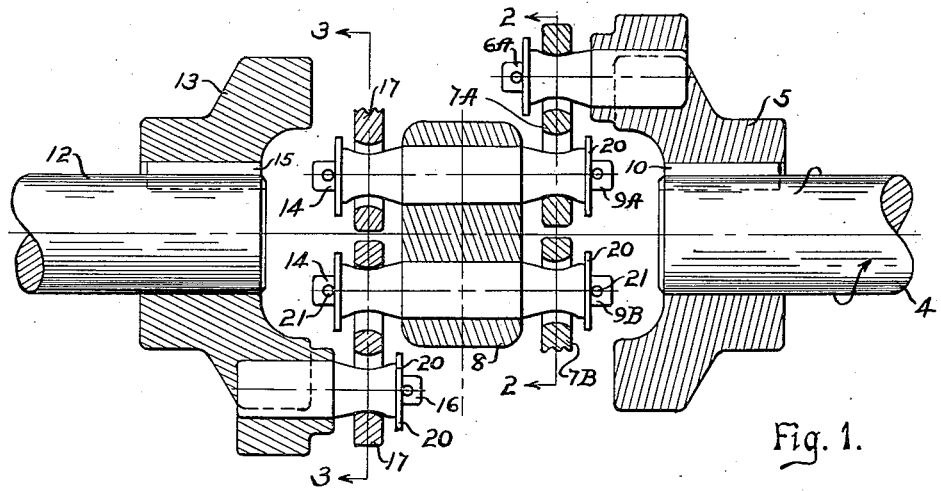
Fig. 1 shows the shafts in alignment and under load and is a longitudinal section on line 1—B— C—D—E—1 of Fig. 2, and 1—B—C—D—E—1 of Fig. 3, this irregular section being taken to show parts transmitting a continuous line of pull from driver to follower, without showing other parts that would confuse the figure.
Figure 2:
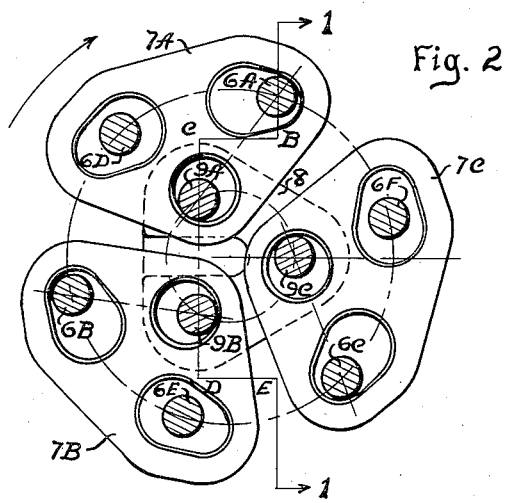
Fig. 2 is a cross section on line 2—2 of Fig. 1, and shows the links on the right of the float member under load with the float member in the back-ground.

Referring now to Figs. 1 and 2:—As driving shaft 4 turns under load in the direction of the arrows, driving pivots 6A, 6B and 6C pull against links 7A, 7B and 7C and pull them respectively against pivots 9A, 9B and 9C on float 8, and turn the float. Moreover, the three links 7A, 7B and 7C exert three equal forces on pivots 6A, 6B and 6C, the pivots being 120 degrees apart and the directions of the forces being 120 degrees apart, and this exerts a turning moment only on flange 5 and shaft 4 and no transverse pressure on the shaft or its bearings. Likewise, the same three links exert three equal forces on pivots 9A, 9B and 9C, these pivots being also 120 degrees apart and the direction of the forces being 120 degrees apart, and this exerts a turning moment only on float 8, and no transverse pressure.

Figure 3:
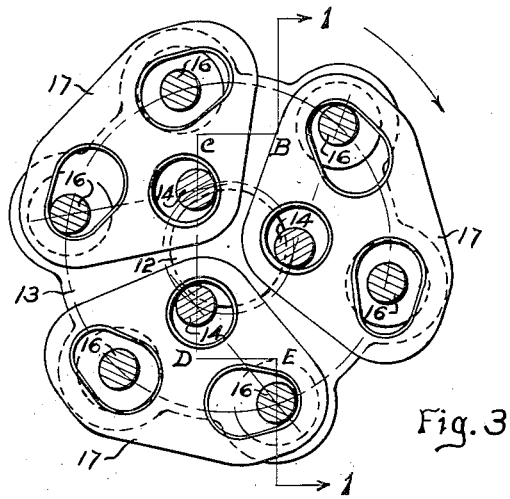
Fig. 3 is a cross section on line 3—3 of Fig. 1, and shows the links on the left of the float member under load, with the left flange in the back-ground.

Referring now to Figs. 1 and 3:—As float 8 turns under load in the direction of the arrows, pivots 14 pull against links 17 and pull them against pivots 16 in flange 13 and turn the flange. As on the opposite side just described, the three links exert three equal forces on float 8 and on flange 12, the points of application being 120 degrees apart and the directions of the forces being 120 degrees apart, and this exerts turning moments only on float and flange and no transverse pressure. The three forces thus applied to each end of the float 8 hold it central and true and it floats. With the shafts in alignment, as in Fig. 1, all parts turn equally; there is no relative movement between links and pivots and no need of lubricant.

Figure 5:
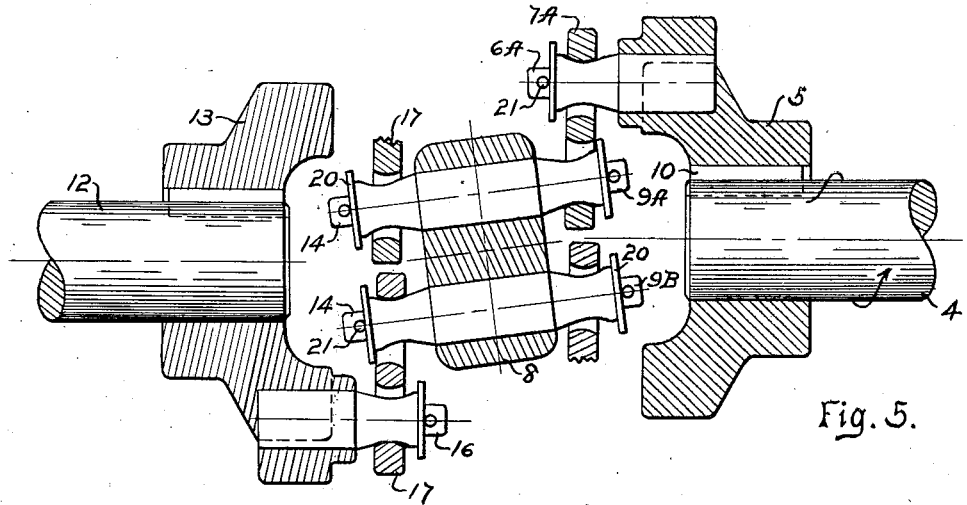
Fig. 5 is a longitudinal section similar to Fig. 1 but with the shafts misaligned by parallel offset.
Figure 6:
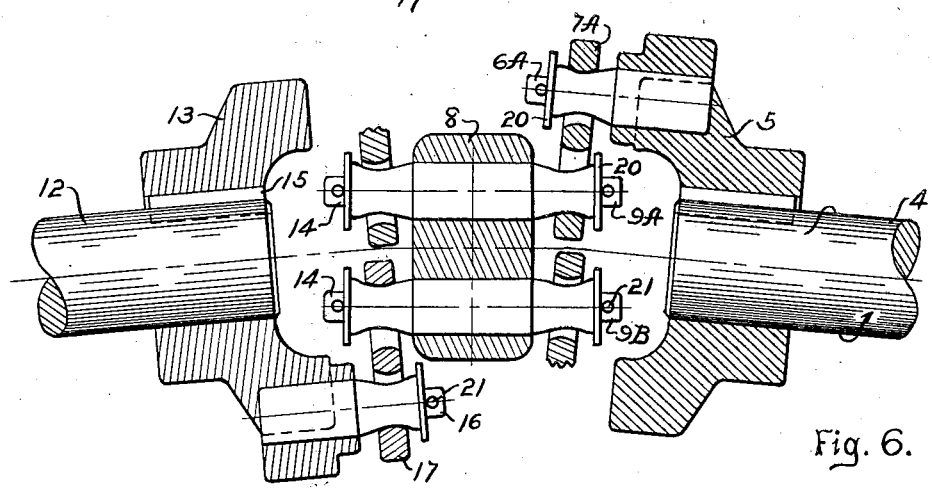
Fig. 6 is a longitudinal section similar to Fig. 1, but with the shafts in angular misalignment.

Referring now to Figs. 5 and 6:—When shafts turning under load are not in alignment, float 8 automatically takes a position at angles with the shafts. To make these angles small, the distance between pivot bearings on opposite ends of the float (from link 7A to link 17 in Fig. 1) should be greater than the distance between pivot bearings on same end (pivot 9A to 9B in Fig. 2) and preferably much greater, as drawn. With misalignment, off-set or angular or both, the links move on the pivots; but with the float and links relatively long as shown in the drawings, the relative movement of the parts is small, and the float automatically turns on its axis and takes a position to balance the forces, to hold the float central and true and to exert pulls nearly equal in all the links with very small transverse pressure on the shafts. This tends to eliminate friction, to reduce wear and to economize power.

Again, consider the half coupling, links 7A, 7B and 7C and the pivots in engagement therewith. Suppose shaft 4 driving in the direction of the arrow and float 8 to be the driven member of the half under consideration. There is a distinct advantage in having three driving and three driven pivots over mechanisms with two driving pivots and two driven pivots at right angles thereto. Not only do the three driving pivots transmit 50% more power than two for a given strength of pivot; they do more. For example, in a Hooke's coupling or universal joint, at a certain point in its revolution, a driven pivot is moving in its orbit faster than is the driving pivot 90 degrees ahead. At the same time the opposite driven pivot is moving in its orbit faster than is the driving pivot 90 degrees ahead of it. When the first driven pivot is moving in its orbit more slowly than the driving pivot 90 degrees ahead of it, then the second driven pivot is moving more slowly also. And when the first driven pivot is moving in its orbit at the same speed as the driven pivot ahead, then the second driven pivot is moving at the same speed as the driving pivot ahead of it. That is the two mechanisms 180 degrees apart function just alike. But the three mechanisms 120 degrees apart do not. When pivot 9A is at the point in the orbit corresponding to maximum speed of the driven pivot of a Hooke's coupling, pivots 9B and 9C are near points of mean average speed of the Hooke's driven pivot. When, again, the float and the links are free to adjust themselves to equal tensions and equal angles, the combination tends to neutralize and not accentuate irregularities and to drive with equal and uniform speed.

The pivots are preferably circular in cross section as shown in Figs. 2, 3 and 4, and bear against concave surfaces in the links of considerably greater radius than the radius of the pivots. The pivots are also curved longitudinally as shown in Figs. 1, 5 and 6, and bear against convex surfaces in the links of less radius than that of the pivot. This permits the links to move slightly on the pivots by a rolling motion with a minimum of sliding, and thus a minimum of wear and power consumption.

As seen in Fig. 2, when pins 6A, 6B and 6C are pulling, pivots 6D, 6E and 6F are idle and separated from the links by wide clearances. This permits pivots 6A, 6B and 6C to pull and to turn the links and the float with the shafts considerably misaligned and with pivots 6D, 6E and 6F still idle and clear.

The links are preferably symmetrical about a center line as shown, and when shaft 4 drives in the direction opposite to the arrows, pivots 6D, 6E and 6F pull against the links 7A, 7B and 7C and drive float 8 in the direction opposite to the arrows also. Pivots 6A, 6B and 6C are then idle and clear of the links, and these pivots and links take the position shown in Fig. 3. Pivots 14 and 16 then pull on the opposite side of the links 17, turning flange 13 and shaft 12 in the direction opposite to the arrows, and these pivots and links then take the positions shown in Fig. 2. In other words, with symmetrical links, the positions of links and pivots are similar but opposite on forward and backward drive. Or they are symmetrical on forward and backward drive as in Figures 2 and 3. If the links are approximately symmetrical, then the positions of links and pivots are approximately symmetrical, or they are approximately opposite on forward and backward drive. "Approximately" is to be broadly construed, as an opposite arrangement of parts may vary much from true geometric symmetry, and still accomplish the forward and backward drive.

Similarly, shaft 12 can be the driving shaft and drive in either direction with shaft 4 the follower, one set of pivots or the other on each flange functioning according to the direction of drive.

The above describes the coupling as running forward or backward under load. When running fast, the centrifugal force of these parts is great, but under heavy load, it will not be sufficient in general to throw the parts to materially different positions from those shown in Figs. 2 and 3. Running in either direction, the heavy torque, and the pull of the links therefrom, holds the float 8 central and turning true on its axis.

Figure 10:
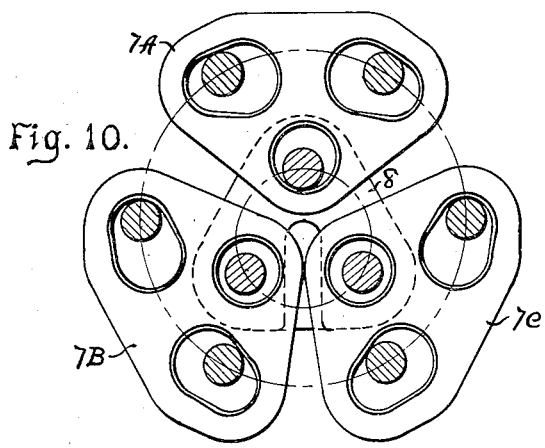
Fig. 10 is a cross section on line 2—2 of Fig. 1, similar to Fig. 2, but with the parts at rest.

It will be evident from Figs. 2 and 10 that when at rest and not under torque, the float cannot fall very far from the central position; not so far but that it quickly takes the central position when torque is applied or when the links throw out by centrifugal force as hereinafter described. It is of prime importance that the float shall not fall so far from the center at rest but that the links shall quickly pull it to center when it starts running.

It remains to be told how float 8 is held central when running idly, and this is very important. Then, due to centrifugal force, the links throw to their outermost positions as shown in Fig. 4. Due to imperfect workmanship, the center of gravity of the float 8 may not be at its center of rotation but, at worst, it will be near it, and the radius of rotation of such center of gravity will be small. The center of gravity of each link is comparatively far from the center of rotation. In other words, the radius of rotation of the center of gravity of each link is comparatively large. As the centrifugal force of a rotating body is proportional to the radius of rotation of its center of gravity, the larger radius of rotation of a link gives it far greater centrifugal force per unit of weight than the centrifugal force of the float. And, with due consideration to the difference in the radii of rotation, the weights of links and float are so proportioned that the centrifugal force of a link is considerably greater than the centrifugal force of the float.

As shown in Fig. 4, each link in this outermost position bears against three pivots, two of which, as 6C and 6F, are held to a definite orbit of rotation by shaft 4 in fixed bearings, and one of which, as 9C, is on the float not so held. Suppose float 8 to be moved to the left of its position in Fig. 4. It pulls link 7C to the left away from its bearings against pivots 6C and 6F. Pivot 9A moves to the left away from its bearing against link 7A and pivot 9B moves to the left away from its bearing against link 7B. The centrifugal force of link 7C, the only link then pulling on float 8, is greater than the centrifugal force of the float as just described, and it then pulls the float back to its central position as shown in Fig. 4. And if the float were moved in any other radial direction, while in rapid rotation, the centrifugal force of one or more links would pull it at once back to center. The links 17 hold the opposite end of the float central in similar manner. And thus the pull of the links due to centrifugal force holds the float to true rotation on its axis. Here again, the three mechanisms 120 degrees apart function differently from two 180 degrees apart. With two links 180 degrees apart, the float could throw in direction at right angles to the line of links, and the links would have but little power to pull it back to center. With three links 120 degrees apart, they have ample power to do so.

The pivots in the float 8 may be on a circle of the same diameter as the pivot circles on the flanges 5 and 13, the pivot 9A taking a position between pivots 6A and 6D, and so on. By putting them on circles of different diameters, as shown in the drawings, we get a much greater effective length of link without increasing the size of the coupling, and the longer the link, the less the errors and the less the motion on the pivots for a given misalignment of shafts.

Again, the flanges may carry three pivots each, on small pivot circles, and the float carry six pivots on each end on large pivot circles, practically the reverse of the design here shown. In this case, the three flange pivots would have to clear the shaft. I prefer the arrangement shown, however, as in it the shaft does not affect the small pivot circle, and the float is small and easily held to central position, and true rotation on its axis.

It will be evident from the figures that as one of the shafts moves endwise, the links simply tilt, a slight tilt of the long links on their curved bearings permitting a considerable endwise motion of the shaft.

Figure 7:
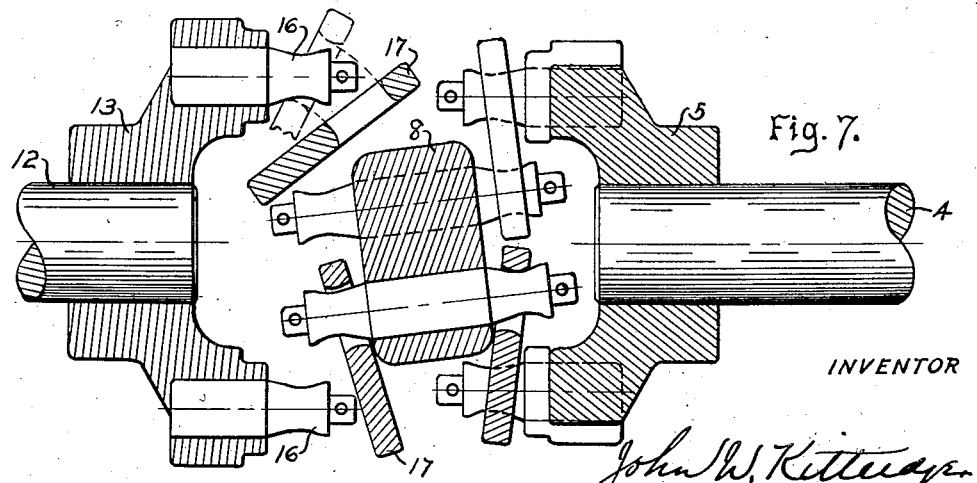
Fig. 7 is a longitudinal section of parts at rest, and shows the links being taken out without moving either shaft.
Figure 8:
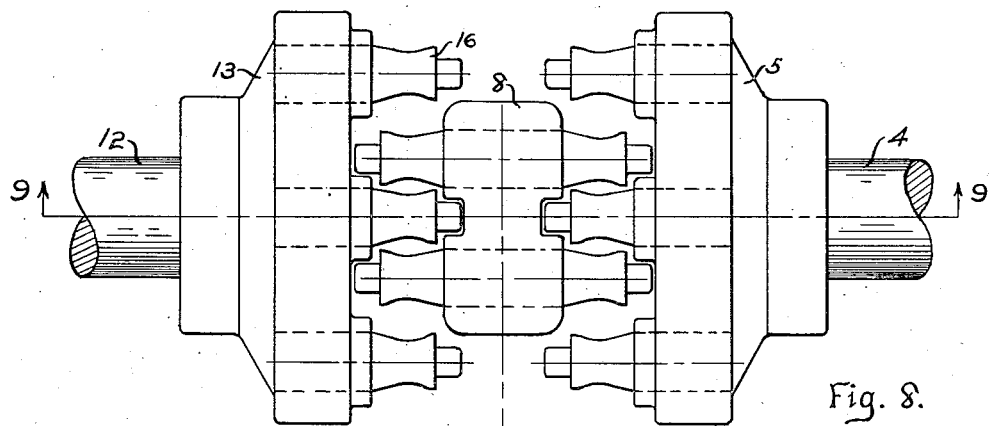
Fig. 8 is a plan of the parts at rest in direction 8—8 of Fig. 9, and shows the float member being taken out without moving either shaft.
Figure 9:
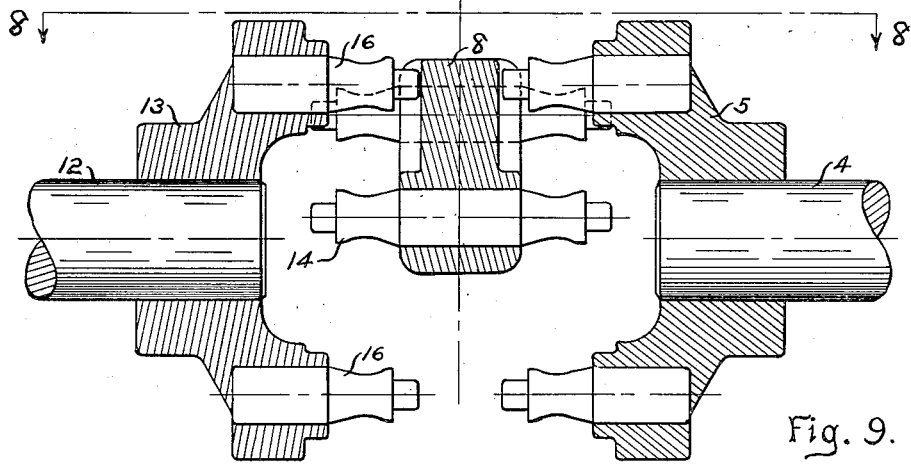
Fig. 9 is a longitudinal section on line 9—9 of Fig. 8.

To remove the coupling with both shafts remaining in place:—It is easy to remove the cotter pins and washers. Then, with the flanges cup-shaped and the holes in the links much larger than the pivots, as shown, the float can be moved endwise and the links removed, as shown in Fig. 7. The float is grooved on opposite sides to clear the flange pivots, and it can be lifted up, as shown in Figs. 8 and 9, the float pivots straddling the flange bosses. In this way, the float can be taken half out, then turned half over and taken clear out. Flanges can then be driven off, and thus the whole coupling removed with both shafts unmolested. And it can be put on in the same manner.

In the following claims, I use the words "rigid" and "non-resilient" to mean members as of thick metal, in contrast to members of rubber, leather or spring metal, in which the yield of the coupling depends on the yield of the material. It will be understood, of course, that my links, pivots and other members yield slightly under load and are not absolutely rigid, but their slight yield in no way affects the working of my mechanism. By "flange" I mean any hub or driving member such as is commonly keyed to a shaft, not necessarily keyed nor of the shape herein illustrated. By "link," I mean a tension member, as the link of a chain. I use "running idly" to apply to the coupling when the torque is very small, as when simply overcoming the friction of the driven parts. This in contrast to the hundreds of pounds of pull or tons of pull in the links when running under load. At high speed, the centrifugal force of the links is very great and a small component of it "turns the float" and the driven parts when running idly. The condition then is practically as shown in Fig. 4. I use "pivot" as defined by Funk & Wagnalls, "Something, typically a pin or short shaft, upon which a related part turns, oscillates or rotates." And as used herein, it is not limited to "pin" or "shaft." I consider the "axis" of a part to be its axis of rotation; its "length" to be measured along said axis; and its "ends" to be at about right angles thereto.

It will be understood that my invention may be made in various forms and styles, and that I do not limit myself to the embodiment herein shown nor by the theories herein expressed, but only by the following claims.

Having thus described my invention, I claim:—

1. In a shaft coupling, the combination of rigid driving and driven flanges, a rigid float, rigid links, flexible driving connections of non-resilient material between said links and said float and flanges, said combination being flexible in all directions and in approximately symmetrical relations on forward and backward drive, and the float controlled when running under load by the pull of the links due to driving torque.

2. In a shaft coupling, the combination of rigid driving and driven flanges, a rigid float, three rigid links adjacent to each flange, flexible driving connections of non-resilient material between said links and said float and flanges, the combination forming two universal joints and being in approximately opposite positions on forward and backward drive, and the float controlled when running under load by the pull of the links due to driving torque.

3. In a shaft coupling, the combination of rigid driving and driven flanges, a rigid float therebetween, rigid links, pivot connections of non-resilient material between said links and each end of said float and the connections to opposite ends of the float being farther apart than the connections to the same end thereof, pivot connections of non-resilient material between said links and said flanges, said flange connections being outside the float connections, said links and connections forming universal joints with backlash therein and being in approximately symmetrical relations on forward and backward drive, and the float controlled when running under load by the pull of the links due to driving torque.

4. In a shaft coupling, the combination of rigid flanges on driving and driven shafts, said shafts spaced apart the length of a flange so that flanges can be driven on and off in assembling and disassembling, a rigid float therebetween, rigid links, the said flanges having clearance to pass the float and links in and out between them, hinge connections of non-resilient material between said links and said float and flanges, said links and connections forming universal joints and being in approximately opposite positions on forward and backward drive, the float controlled when running under load by the pull of the links due to driving torque, and controlled when running idly by the pull of the links due to centrifugal force.

5. In a shaft coupling, the combination of rigid driving and driven flange members, a rigid float member, rigid links, flexible forward driving connections of non-resilient material between said links and said members, flexible backward driving connections of non-resilient material between said links and said members, and the said combination flexible in all directions.

6. In a shaft coupling, the combination of rigid driving and driven flanges, a rigid float therebetween, three rigid links adjacent to each flange, hinge connections of non-resilient material between said links and each end of said float, the connections to opposite ends of the float being farther apart than the connections to the same end thereof, hinge connections of non-resilient material between said links and said flanges, the flange connections being outside the float connections, and the links and connections forming all-way hinges and being in approximately symmetrical relations on forward and backward drive.

7. In a shaft coupling, the combination of rigid driving and driven flanges, a rigid float, rigid links, and flexible driving connections of rigid material between said links and said float and flanges, the said links and connections forming universal joints and on forward drive being approximately opposite to their positions on backward drive, the links when running idly throwing outward due to centrifugal force and their outermost positions being controlled by the flange connections, the float when running idly being held by the connections to the links, and the float thereby held in central alignment.

8. In a shaft coupling, the combination of rigid driving and driven flanges, a rigid float, rigid pivots on said float and flanges, three rigid links at each end of the float from the float pivots to the flange pivots, said links and said pivots engaging on double curved bearing surfaces convex in one direction and concave in direction at right angles thereto with holes in the links larger than the heads of the pivots, the links when running idly throwing outward due to centrifugal force and their outermost positions being controlled by the flange pivots, the float when running idly being held by the float pivots, and the float thereby held in central alignment.

9. A shaft coupling comprising rigid driving and driven members, a rigid float therebetween, rigid links, pivot connections of rigid material from said float and driving and driven members to said links, said links and connections forming universal joints, the pull of the links being approximately tangential to the path of the float connections and adapted to turn the float on its axis when running under load, and the pull of the links due to centrifugal force being approximately radial and adapted to turn the float on its axis when running idly.

10. A shaft coupling comprising rigid driving and driven flanges, a rigid float, rigid links, flexible driving connections of rigid material from said float and flanges to said links, the combination being flexible in all directions, the float being controlled by the oblique pull of the links due to driving torque when running under load, and by the outward pull of the links due to centrifugal force when running idly.

11. A shaft coupling comprising rigid driving and driven flanges, a rigid float, three rigid links adjacent to each flange, flexible driving connections of rigid material from said float and flanges to said links, said links and connections forming two all-way hinges and being in approximately opposite positions on forward and backward drive, the float being controlled by the oblique pull of the links due to driving torque when running under load, and by the outward pull of the links due to centrifugal force when running idly.

12. A shaft coupling comprising rigid driving and driven flanges, a rigid float therebetween, rigid links, pivot connections of rigid material from each end of said float to said links, the connections to opposite ends of the float being farther apart than the connections to the same end thereof, and pivot connections of rigid material from said flanges to said links, the flange connections being outside the float connections, said links and connections forming two all-way hinges, the float being controlled by the oblique pull of the links due to driving torque when running under load, and by the outward pull of the links due to centrifugal force when running idly.

13. A shaft coupling comprising rigid driving and driven flanges, a rigid float, rigid intermediate members, hinge connections of rigid material between said intermediate members and said float and flanges, said intermediate members and connections forming universal joints and being in approximately symmetrical relation on forward and backward drive, and the coupling balanced around its axes of rotation.

14. A shaft coupling comprising rigid driving and driven flanges, a rigid float, three rigid intermediate members adjacent to each flange, hinge connections of rigid material between said intermediate members and said float and flanges and the float connections and flange connections being different distances from their axes of rotation, the intermediate members and connections forming two all-way hinges and being in approximately symmetrical relation on forward and backward drive, and the coupling balanced around said axes.

15. A shaft coupling comprising rigid driving and driven flanges, a rigid float, three driving connections of rigid material from said float to each flange, said connections being flexible in all directions and approximately symmetrical on forward and backward drive, and the coupling balanced around its axes of rotation.

16. A shaft coupling comprising rigid driving and driven flanges, a rigid float, a joint flexible in all directions between the float and each flange, and each joint comprising three driving connections of rigid material equidistant from the axis of rotation and equidistant from each other.

17. A shaft coupling comprising rigid driving and driven flanges, a rigid float, a joint between the float and each flange, each of said joints being flexible in all directions and each comprising three rigid intermediate members movable on pivot bearings and thereby yieldable longitudinally.

18. A shaft coupling comprising rigid driving and driven flanges, a rigid float, a joint between the float and each flange, each of said joints being flexible in all directions and each comprising three rigid intermediate members movable on pivot bearings and thereby yieldable longitudinally, and each of said joints approximately symmetrical on forward and backward drive and balanced around its axes of rotation.

19. A shaft coupling comprising rigid driving and driven flanges, a rigid float, three pivoted rigid driving members between the float and each flange forming joints flexible in all directions, and the float controlled by the said driving members on forward and backward drive and when running idly or under load.

20. A shaft coupling comprising rigid driving and driven flanges, a rigid float therebetween, rigid forward driving pivots on said flanges, rigid backward driving pivots on said flanges, rigid pivots on each end of said float, rigid links from the float pivots to the flange pivots with clearance between links and pivots, each link on forward drive adapted to engage a float pivot and a forward driving flange pivot and on backward drive to engage said float pivot and a backward driving flange pivot, and when running idly to engage all three pivots aforesaid.

21. A shaft coupling comprising rigid driving and driven flanges, a rigid float therebetween, rigid forward driving pivots on said flanges, rigid backward driving pivots on said flanges, said flange pivots arranged 60 degrees apart on circles, rigid pivots on each end of said float, said float pivots arranged 120 degrees apart on circles of less diameter than the flange pivot circles, six rigid links from the float pivots to the flange pivots, each link triangular in general form and with holes approximately egg-shaped enclosing a forward driving and a backward driving flange pivot, each link on forward drive adapted to engage a float pivot and the forward driving flange pivot, and on backward drive to engage said float pivot and the backward driving flange pivot, and when running idly to engage all three pivots aforesaid.

22. A shaft coupling comprising rigid driving and driven flanges, a rigid float therebetween, rigid pivots on each end of said float, said pivots 120 degrees apart and pivots on opposite ends of said float farther apart than pivots on the same end thereof, rigid forward driving pivots and rigid backward driving pivots on said flanges, said pivots 60 degrees apart in circles outside the float pivots, double curved bearing surfaces on said float and flange pivots convex in one direction and concave in direction at right angles thereto, six rigid links from the float pivots to the flange pivots, double curved bearing surfaces in said links concave in one direction and convex in direction at right angles thereto, each link triangular in general form and with holes approximately egg-shaped enclosing a forward driving and a backward driving flange pivot, each link on forward drive adapted to engage a float pivot and the forward driving flange pivot, and on backward drive to engage said float pivot and the backward driving flange pivot, and when running idly to engage all three pivots aforesaid.

JOHN W. KITTREDGE.